(12) United States Patent
Miyazaki et al.

(10) Patent No.: US 8,833,420 B2
(45) Date of Patent: *Sep. 16, 2014

(54) METAL CORD, RUBBER-CORD COMPLEX AND PNEUMATIC TIRE USING THE SAME

(75) Inventors: Shinichi Miyazaki, Kobe (JP); Junichi Kodama, Futtsu (JP); Yasuo Sakai, Utsunomiya (JP); Keisuke Aramaki, Utsunomiya (JP); Yuichi Sano, Utsunomiya (JP); Kenichi Okamoto, Itami (JP)

(73) Assignees: Sumitomo Rubber Industries, Ltd., Kobe (JP); Nippon Steel & Sumitomo Metal Corporation, Tokyo (JP); Sumitomo (SEI) Steel Wire Corp., Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/399,382

(22) Filed: Feb. 17, 2012

(65) Prior Publication Data

US 2012/0199259 A1 Aug. 9, 2012

Related U.S. Application Data

(62) Division of application No. 12/085,546, filed as application No. PCT/JP2006/323964 on Nov. 30, 2006, now abandoned.

(30) Foreign Application Priority Data

Dec. 13, 2005 (JP) ................................. 2005-359332

(51) Int. Cl.
 *B60C 9/00* (2006.01)
 *C23C 2/26* (2006.01)

(Continued)

(52) U.S. Cl.
 CPC ....... *B60C 9/0007* (2013.01); *D07B 2401/2035* (2013.01); *C23C 2/26* (2013.01); *D07B 1/0666* (2013.01); *C25D 5/10* (2013.01); *C25D 5/50* (2013.01); *B60C 9/2006* (2013.01);

(Continued)

(58) Field of Classification Search
 USPC ......................................... 156/150, 151, 451
 See application file for complete search history.

(56) References Cited

U.S. PATENT DOCUMENTS 3,291,707 A * 12/1966 Abbey et al. .................. 205/143
3,749,558 A *  7/1973 Dillenschneider ............ 428/675

(Continued)

FOREIGN PATENT DOCUMENTS

EP      0230071 A1      7/1987
EP      1295985 A1 *    3/2003

(Continued)

*Primary Examiner* — Daniel McNally
(74) *Attorney, Agent, or Firm* — Birch, Stewart, Kolasch & Birch, LLP (57) ABSTRACT

Rubber-cord complex 9 having improved wet heat adhesive property between rubber and cord. The rubber-cord complex includes cord 10 comprising drawn plated wire 17 prepared by providing brass plated layer 16E on surface of element wire 15 and drawing the resulting plated wire and rubber 12 vulcanized and bonded to cord 10. The rubber-cord complex 9 has adhesion reaction layer 25 (formed by cross-linking sulfur and copper) between rubber 12 and brass plated layer 16E. Adhesion reaction layer 25 has average thickness of 50-1,000 nm. Interface S between adhesion reaction layer 25 and the rubber has a fractal dimension of 1.001-1.300 in a wet heat deterioration state after being subjected to vulcanization to bond rubber 12 thereto and being held at a temperature of 50-100° C. and a humidity of 60-100% for one hour to 20 days.

2 Claims, 4 Drawing Sheets

(51) Int. Cl.

| | | |
|---|---|---|
| *D07B 1/06* | (2006.01) | |
| *C25D 5/10* | (2006.01) | |
| *C25D 5/50* | (2006.01) | |
| *B60C 9/20* | (2006.01) | |
| *C23C 28/02* | (2006.01) | |
| *C23C 10/02* | (2006.01) | |
| *C25D 7/06* | (2006.01) | |

(52) U.S. Cl.
CPC ............... *C23C 28/025* (2013.01); *C23C 10/02* (2013.01); *C25D 7/0607* (2013.01); *D07B 2205/3089* (2013.01); *D07B 2501/2076* (2013.01); *C23C 28/023* (2013.01); *D07B 2201/2011* (2013.01); *C23C 28/021* (2013.01); *D07B 2501/2046* (2013.01); *D07B 2401/2095* (2013.01)
USPC ........................................................ 156/451

(56) References Cited

U.S. PATENT DOCUMENTS

| | | | |
|---|---|---|---|
| 4,347,290 A * | 8/1982 | Haemers | 428/625 |
| 4,545,834 A | 10/1985 | Shemenski et al. | |
| 4,645,718 A | 2/1987 | Dambre | |
| 4,677,033 A | 6/1987 | Coppens et al. | |
| 4,704,337 A | 11/1987 | Coppens et al. | |
| 4,859,289 A | 8/1989 | Nishimura et al. | |
| 5,100,517 A * | 3/1992 | Starinshak et al. | 205/138 |
| 6,475,640 B1 | 11/2002 | Doujak et al. | |
| 6,706,418 B2 | 3/2004 | Egli et al. | |
| 2002/0055011 A1 | 5/2002 | Brabant et al. | |
| 2004/0247865 A1 | 12/2004 | Pavan | |
| 2005/0147818 A1 | 7/2005 | Oosawa et al. | |
| 2007/0261965 A1 | 11/2007 | Heller et al. | |
| 2012/0145297 A1 * | 6/2012 | Miyazaki et al. | 152/451 |

FOREIGN PATENT DOCUMENTS

| | | |
|---|---|---|
| JP | 62-288634 A | 12/1987 |
| JP | 2-61187 A | 3/1990 |
| JP | 1-295842 | 3/1993 |
| JP | 6-49783 A | 2/1994 |
| JP | 6-184966 A | 7/1994 |
| JP | 7-268787 A | 10/1995 |
| JP | 2003-94108 A | 4/2003 |
| JP | 2003-96594 A | 4/2003 |
| JP | 2003-231992 A | 8/2003 |
| JP | 2003-239183 A | 8/2003 |
| JP | 2003-301391 A | 10/2003 |
| JP | 2007-9343 A | 1/2007 |

* cited by examiner

METAL CORD, RUBBER-CORD COMPLEX AND PNEUMATIC TIRE USING THE SAME

CROSS REFERENCE

The present application is a 37 C.F.R. §1.53 (b) divisional of, and claims priority to, U.S. application Ser. No. 12/085, 546, filed Jul. 29, 2008 now abandoned. Application Ser. No. 12/085,546 is the national phase under 35 U.S.C. §371 of International Application No. PCT/JP2006/323964, filed on Nov. 30, 2006. Priority is also claimed to Japanese Application 2005-359332 filed on Dec. 13, 2005. The entire contents of each of these applications is hereby incorporated by reference.

TECHNICAL FIELD

The present invention relates to a metal cord and a rubber-cord complex in which an adhesion reaction layer formed between a rubber and a brass plated layer of a plated element wire is specified to thereby suppress deterioration in adhesiveness between the plated wire and the rubber under a wet heat environment, and a pneumatic tire using the complex.

BACKGROUND ART

As a reinforcing element for rubber products such as pneumatic tires, hoses and industrial belts, a metal cord has been popularly used from the viewpoints of good reinforcing effect and the like. In a rubber-cord complex such as a rubber product reinforced with such a metal cord, the surface of element wires of the cord is plated with brass containing copper and zinc in order to enhance the adhesive property of the metal cord to the rubber. Typically, this brass plating is performed in such a manner as sequentially forming a copper plated layer and a zinc plated layer on the surface of an element wire and then subjecting them to thermal diffusion to give an alloy of the two metals.

It is known that the adhesive property between the brass plated layer and the rubber is revealed by formation of an adhesion reaction layer between the brass plated layer and the rubber through a cross-linking reaction which occurs between copper in the brass plated layer and sulfur incorporated into the rubber during vulcanization of the rubber.

DISCLOSURE OF INVENTION

Problem to be Solved by the Invention

However, although a conventional brass plating has a good adhesive property in an initial stage after the vulcanization (initial adhesive property), it tends to be poor in wet heat adhesive property such that the adhesive property decreases under a wet heat environment at high temperature and high humidity and the brass plating is more likely to separate from the rubber. It is effective for improving the wet heat adhesive property to add an organocobalt salt to the rubber. However, the organocobalt salt is expensive, and has a property of making an unvulcanized rubber apt to deteriorate or thermally deteriorate. Hence the amount of the organocobalt salt to be incorporated is limited, so a sufficient increase in wet heat adhesive property is not achieved thereby.

As other technologies to improve the wet heat adhesive property are known, for example, a method of suppressing diffusion of copper into rubber, as disclosed in JP-A-2003-096594, wherein the content of copper in the brass plated layer is limited to 62% or less to suppress excessive formation of a sulfide at the interface with the rubber, and a method of suppressing corrosion reaction and adhesion reaction at the interface with the rubber, as disclosed in JP-A-2003-094108 and JP-B-1812616, by plating a ternary alloy of copper, zinc and nickel as a brass plating. However, in these methods, no investigation about structure of plated layer (structure of reaction layer) optimum to improvement of wet heat adhesive property has been made from the viewpoint of mechanism of wet heat deterioration. As a result, the effects are limitative and do not reach a practical level.

In view of such circumstances, the present inventors conducted an intensive study and, as a result, they have found that the adhesive property under the wet heat environment can be exhibited on a higher level as compared with a conventionally achieved adhesive property when the state of irregularity of the interface between the adhesion reaction layer and the rubber and the average thickness of the adhesion reaction layer fall within specific ranges.

Accordingly, a primary object of the present invention is to provide a rubber-cord complex having a wet heat adhesive property improved basically by specifying the state of irregularity of the interface between the adhesion reaction layer and the rubber and the average thickness of the adhesion reaction layer.

A second object of the present invention is to provide a metal cord suitable for use in the rubber-cord complex and capable of improving its wet heat adhesive property to a rubber vulcanized and adhered thereto.

A third object of the present invention is to provide a pneumatic tire with its durability improved by the use of the rubber-cord complex as mentioned above.

Means to Solve the Problem

The present invention as claimed in claim 1 is directed to a rubber-cord complex obtained by vulcanizing a rubber to adhere it to a metal cord comprising a drawn plated wire prepared by providing a plated layer of brass containing copper and zinc on the surface of a metal wire and drawing the resulting plated wire, wherein:

the rubber-cord complex has an adhesion reaction layer formed by a cross-linking reaction of sulfur in the rubber and copper in the brass plated layer, between the rubber and the brass plated layer, and in the wet heat deterioration state of the metal cord to which the rubber has been vulcanized and bonded and which has been held in an atmosphere having a temperature of 50 to 100° C. and a humidity of 60 to 100% for one hour to 20 days, the average thickness of the adhesion reaction layer is from 50 to 1,000 nm, and the interface between the adhesion reaction layer and the rubber has a fractal dimension of 1.001 to 1.300.

One embodiment of the prevent invention conemplates a metal cord for use in the rubber-cord complex described above. In this embodiment, the brass plated layer is formed by thermal diffusion of a copper plated layer and a zinc plated layer formed by plating in layers on a metal wire, in which the copper plated layer is formed by plating at a current density of 15 to 25 $A/dm^2$, the zinc plated layer is formed by plating at a current density of 40 to 60 $A/dm^2$, and the thermal diffusion is conducted by a low temperature diffusion at a temperature of 500 to 550° C.

One embodiment of the present invention contemplates a metal cord for use in the rubber-cord complex described above. In this embodiment, the brass plated layer is formed by thermal diffusion of a copper plated layer and a plated layer of a zinc alloy selected from a zinc-nickel alloy and a zinc-cobalt alloy, the layers being formed in layers on a metal wire, in which the copper plated layer is formed by plating at a current density of 15 to 25 A/dm$^2$, the zinc alloy plated layer is formed by plating at a current density of 40 to 60 A/dm$^2$, and the thermal diffusion is conducted by a low temperature diffusion at a temperature of 500 to 550° C.

Another embodiment of the present invention provides a pneumatic tire in which the rubber-cord complex described above is used as a ply for tire reinforcement.

Effects of the Invention

As stated above, in the present invention, the irregularity of the interface between a rubber and an adhesion reaction layer in which sulfur in the rubber and copper in a brass plated layer bond to each other by a cross-linking reaction, is increased and complicated such that the fractal dimension of the interface falls within the range of 1.001 to 1.300. Also, the average thickness of the adhesion reaction layer is properly secured. As a result, the bonding force to the rubber at the interface of the adhesion reaction layer can be sufficiently increased and, in addition, increase in strength of the adhesion reaction layer itself can be achieved. Thus, by a synergistic effect of them, improvement in wet heat adhesive property between the rubber and the cord can be achieved.

EXPLANATION OF REFERENCE NUMERALS

1: Pneumatic tire
9: Rubber-cord complex
10: Cord
12: Rubber
15: Element wire
15E: Element wire after drawing
16, 16E: Brass plated layer
17A, 17E: Plated wire
20A: Copper plated layer
20B: Zinc plated layer
25: Adhesion reaction layer
S: Interface of adhesion reaction layer

BEST MODE FOR CARRYING OUT THE INVENTION

Figure 1:
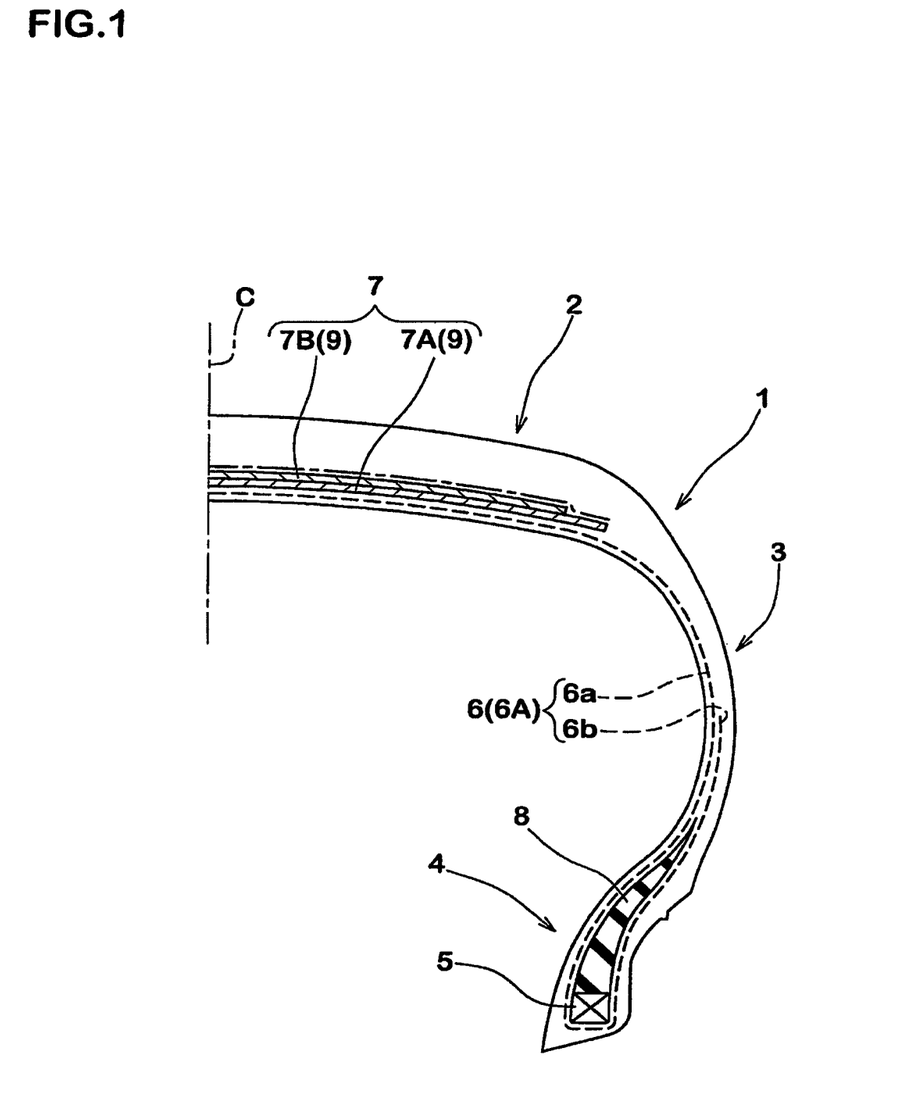
FIG. 1 is a cross sectional view showing an example of pneumatic tires in which a rubber-cord complex of the present invention is used as a ply for tire reinforcement.
Figure 2:
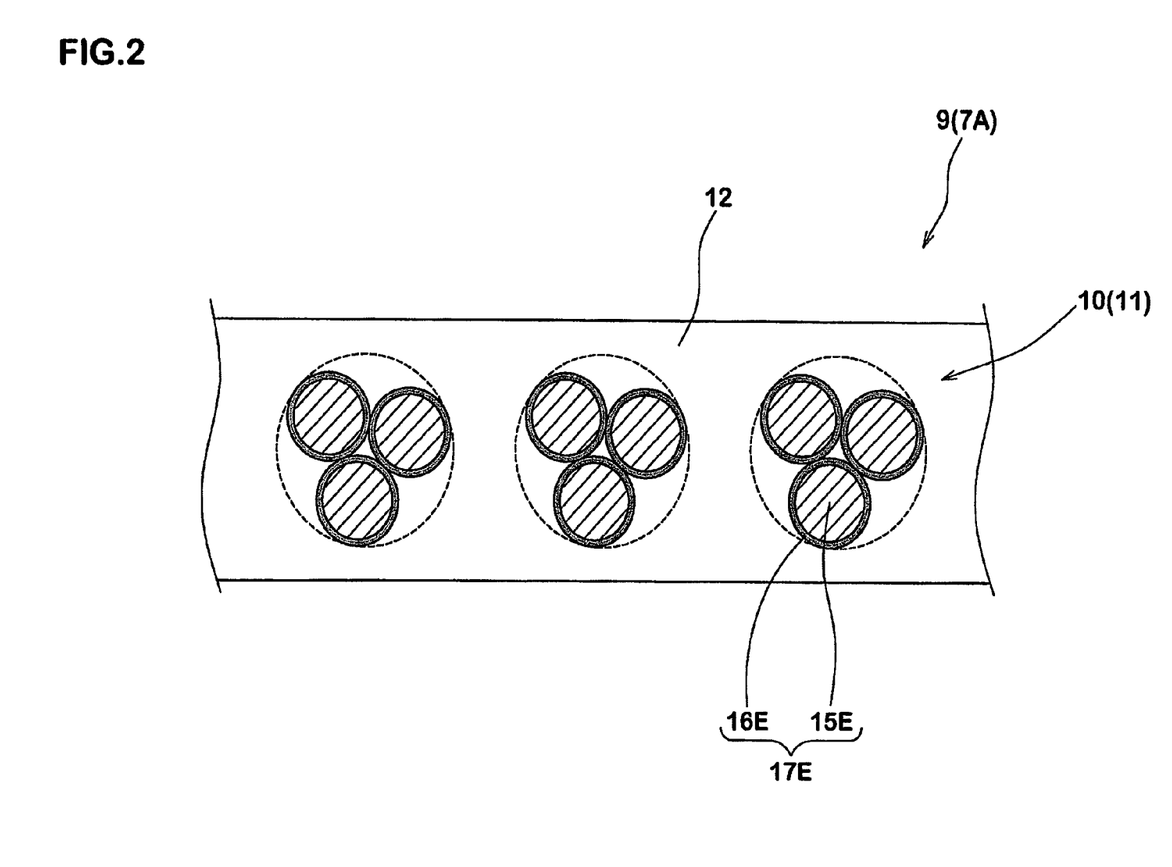
FIG. 2 is a cross sectional view showing the ply mentioned above which is the rubber-cord complex.

An embodiment of the present invention will be explained below along with illustrated examples. FIG. 1 is a cross sectional view showing a pneumatic tire in which a rubber-cord complex of the present invention is used as a ply for tire reinforcement. FIG. 2 is a cross sectional view showing the above-mentioned ply which is the rubber-cord complex.

In FIG. 1, a pneumatic tire 1 shown in this example is a radial tire for passenger cars, and it includes a carcass 6 extending from a tread portion 2 to bead cores 5 in bead portions 4 through sidewall portions 3, and a belt layer 7 arranged radially outward of the carcass 6 in the tread portion 2.

In this example, the carcass 6 is formed of one or more carcass plies 6A having carcass cords arranged, for example, at an angle of 75 to 90 degrees with respect to the circumferential direction of the tire. The carcass ply 6A comprises a ply main body portion 6a extending between the bead cores 5, 5, and ply turnup portions 6b that are turned up around the bead cores 5 from the inside to the outside at each end of the ply main body portion 6a. A bead apex rubber 8 extending radially outwardly from the bead core 5 in a tapered manner is disposed between the ply main body portion 6a and the ply turnup portion 6b, whereby a portion from the bead portion 4 to the sidewall portion 3 is reinforced.

The belt layer 7 comprises two or more belt plies, two belt plies 7A, 7B in this example, having belt cords arranged at an angle of 10 to 45 degrees with respect to the circumferential direction of the tire. The belt plies are stacked so that the belt cords in one ply intersects with those in another belt ply to thereby enhance the belt rigidity so as to firmly reinforce the tread portion 2.

In the present example, the rubber-cord complex 9 of the present invention is adopted to the belt plies 7A, 7B out of the plies for tire reinforcement including the carcass ply 6A and the belt plies 7A, 7B.

As shown in FIG. 2, the rubber-cord complex 9 is composed of a cord array body 11 that metal cords 10 as belt cords are arranged mutually in parallel, and a rubber 12 for topping formed by covering the surface and back of the cord array body 11 with the rubber and subjecting the rubber to vulcanization-bonding to the cord array body. The "vulcanization-bonding" is achieved by vulcanization heat applied when an unvulcanized green tire is vulcanized and molded in a mold.

As the rubber 12 for topping can be suitably used conventional rubbers for use in tires, in which sulfur is incorporated in a rubber base material. Besides sulfur, known additives, e.g., a vulcanization accelerator and a vulcanization acceleration assistant, are selectively used for the rubber 12 in order to obtain required physical properties of the rubber. As the rubber base material are preferably used diene rubbers such as natural rubber, isoprene rubber, butadiene rubber and styrene/butadiene rubber. The diene rubbers are used alone or in the form of a blend of two or more rubbers. Table 1 shows an example of a rubber composition for the rubber 12. The composition dose not contain any organocobalt salt as mentioned above.

TABLE 1

| Ingredients | Parts by weight |
| --- | --- |
| Natural rubber | 100 |
| Carbon black (HAF) | 60 |
| Zinc oxide | 8 |
| Antioxidant *1 | 2 |
| Mineral oil | 2 |
| Vulcanization accelerator *2 | 1 |
| Sulfur | 5 |

*1 2,2,4-trimethyl-1,2-dihydroquinoline polymer
*2 DZ: N,N'-dicyclohexyl-2-benzothiazolylsulfenamide The metal cord 10 is composed of at least one drawn plated wire 17E obtained by forming a brass plated layer 16 on the surface of a metal element wire 15 and drawing the resulting plated wire. In case that the metal cord 10 is composed of a plurality of drawn plated wires 17E, the wires 17E are twisted in a known twisting structure such as bundle-twisting or layer-twisting. A metal cord 10 having a 1×3 structure where three plated wires 17E are twisted together is shown in FIG. 2.

The brass plated layer 16 is a brass-based plating containing copper and zinc as main components. In the present invention, it is possible to employ a binary alloy plating comprised of copper and zinc, or a ternary alloy plating containing, besides copper and zinc, cobalt or nickel as a third metal. In both cases of the binary alloy plating and the ternary alloy plating, it is preferable that the content of copper is in the range of 60 to 80 parts by weight and the content of zinc is in the range of 40 to 20 parts by weight, with respect to 100 parts by weight of the plating. Further, in the case of the ternary alloy plating, it is preferable that the content of cobalt is in the range of 0.1 to 5.0 parts by weight and the content of nickel is in the range of 1.0 to 10.0 parts by weight.

Figure 3A:
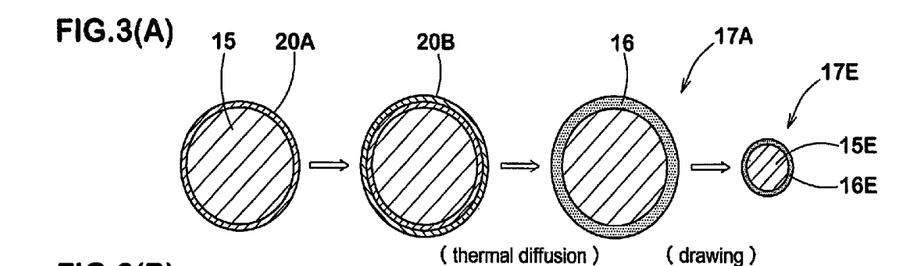
FIG. 3A is a view explaining steps to form a brass plated layer of a binary alloy.

As shown in FIG. 3(A), the brass plated layer 16 made of the binary alloy plating is formed in such a manner that primary plated layers 20, i.e., a copper plated layer 20A and a zinc plated layer 20B, are formed one after another on the surface of a metal element wire 15, and then subjected to thermal diffusion to alloy the both metals (copper and zinc). Numeral 17A denotes a plated element wire prior to drawing, and numeral 17E denotes a plated wire after drawing. The copper plated layer 20A can be formed by electroplating treatment in a copper plating bath such as a copper pyrophosphate bath or a copper sulfate bath. The zinc plated layer 20B can be formed by electroplating treatment in a zinc plating bath such as a zinc sulfate bath. Further, the thermal diffusion is performed by thermally treating an element wire 15 having the copper plated layer 20A and the zinc plated layer 20B in a heating apparatus.

Figure 3B:
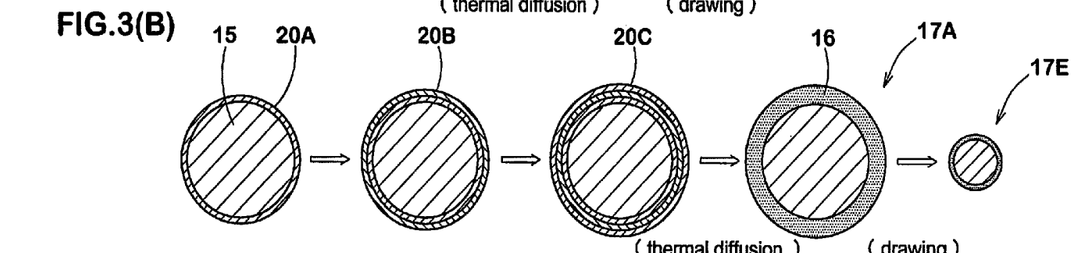
FIG. 3B is a view explaining steps to form a brass plated layer of a ternary alloy.

In the case of forming the brass plated layer 16 made of a ternary alloy plating, as shown in FIG. 3(B), in addition to the copper plated layer 20A and the zinc plated layer 20B, a third metal plated layer 20C is formed by electroplating treatment in a third metal bath which is a cobalt bath or a nickel bath, and the three layers are then thermally diffused and alloyed.

The order of formation of respective primary plated layers is not particularly restricted. However, in case that the element wire 15 is made of steel, it is not preferable to firstly form the zinc plated layer 20B from the viewpoint of the plating peeling property since a hard and fragile alloy phase of iron and zinc is produced on the surface of the element wire 15. Further, diffusion tends to occur with difficulty between the copper plated layer 20A and the third metal plated layer 20C as compared with an interface between other plated layers. Therefore, it is preferable not to dispose the copper plated layer 20A and the third metal plated layer 20C adjacently to each other. Therefore, in the case of the binary alloy plating, the order of the copper plated layer 20A and the zinc plated layer 20B is preferred, and in the case of the ternary alloy plating, the order of the copper plated layer 20A, the zinc plated layer 20B and the third metal plated layer 20C is preferred.

After formation of the brass plated layer 16, the plated wire 17A is subjected to a known wire drawing process to give a plated wire 17E drawn to a desired diameter. Numeral 16E denotes a brass plated layer in the drawn plated wire 17E, and numeral 15E denotes a wire 15 in the drawn plated wire 17E.

Figure 3C:
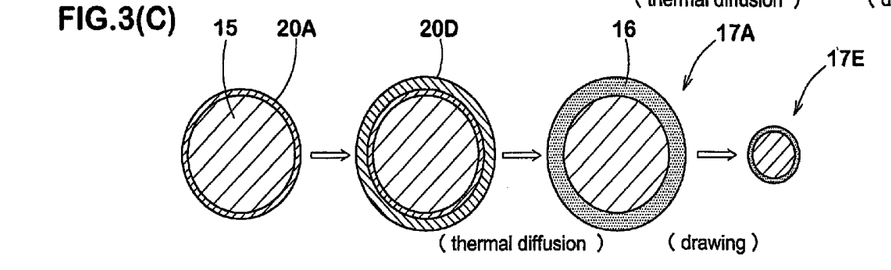
FIG. 3C is a view explaining another steps to form a brass plated layer of a ternary alloy.

Further, another method for forming the brass plated layer 16 made of the ternary alloy plating is a method wherein, as shown in FIG. 3(C), the copper plated layer 20A is firstly formed on the surface of the metal wire 15 and, thereafter, a plated layer 20D of an alloy of zinc and nickel or an alloy of zinc and cobalt is formed on the copper plated layer 20A. Subsequently, the plated layers are subjected to thermal diffusion to give the brass plated layer 16. This alloy plated layer 20D can be formed by electroplating treatment in an alloy bath containing zinc sulfate and nickel or an alloy bath containing zinc sulfate and cobalt. When the brass plated layer 16 is formed in this manner, the content of the third metal in the external surface after the thermal diffusion decreases relatively as compared with the case of forming the third metal plated layer 20C as the outermost layer (the case shown in FIG. 3(B)). It is therefore possible to improve the drawing processability in the wire drawing step.

Figure 4:
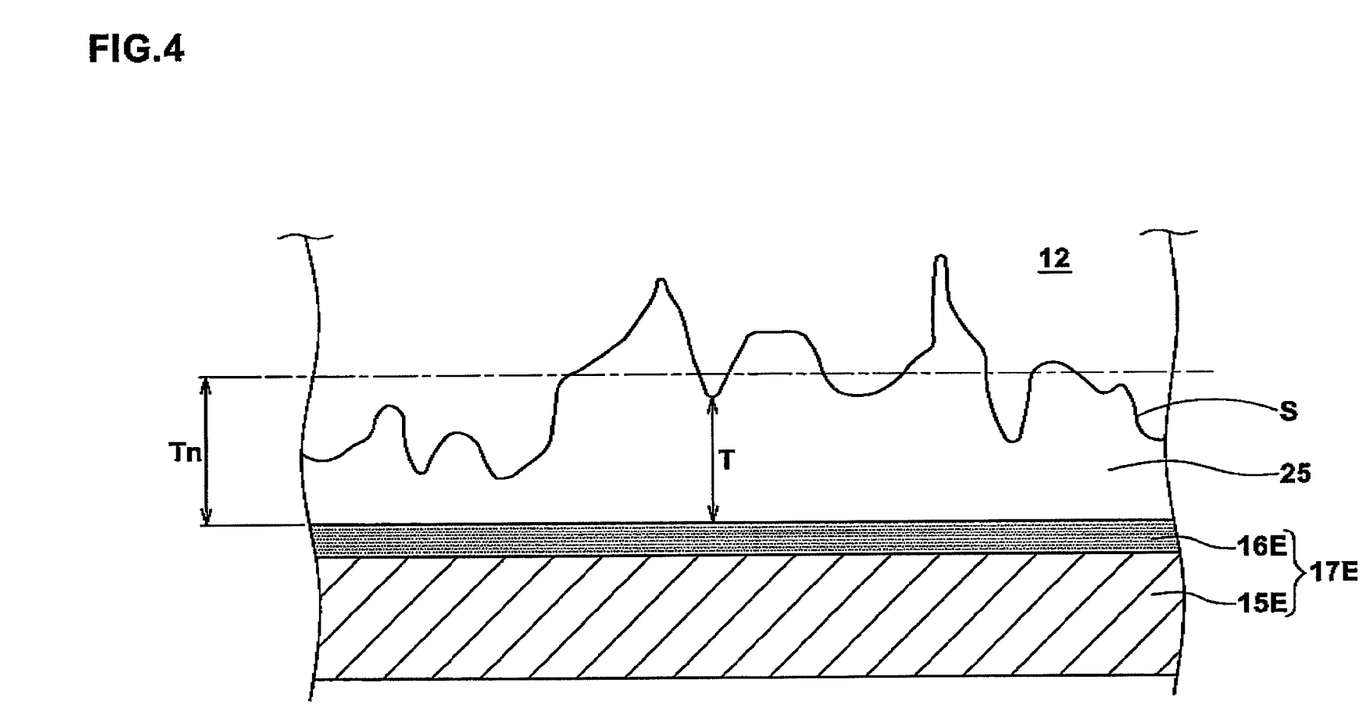
FIG. 4 is a conceptual view showing an adhesion reaction layer formed at the interface between a rubber and a brass plated layer.

The adhesive property between the brass plated layer 16E and the rubber 12 is exhibited by formation of an adhesion reaction layer 25 at an interface between the brass plated layer 16E and the rubber 12, as shown in FIG. 4. The adhesion reaction layer 25 is formed from copper in the brass plated layer 16E and sulfur incorporated in the rubber 12 that cause a cross-linking reaction to combine each other during vulcanization of the rubber. Improvement in wet heat adhesive property between the rubber 12 and the plated wire 17 can be achieved by increasing the strength of the adhesion reaction layer itself and increasing the adhesive force between the adhesion reaction layer 25 and the rubber 12.

For this purpose, in the present invention, when the metal cord 10 to which the same rubber as the above-mentioned rubber 12 has been vulcanized and bonded, or the rubber-cord complex 9 itself, is in the wet heat deterioration state after being held in an atmosphere at a temperature of 50 to 100° C. and a relative humidity of 60 to 100% for one hour to 20 days, the adhesion reaction layer 25 is required to have an average thickness Tn of 50 to 1,000 nm, and the interface S between the adhesion reaction layer 25 and the rubber 12 is required to have a fractal dimension of 1.001 to 1.300. In addition, in order to further ensure the effects of improvement in wet heat adhesive property, the wet heat deterioration environment is preferably set at a temperature of 70 to 100° C. and a relative humidity of 80 to 100% for a period of 10 to 20 days.

If the average thickness Tn of the adhesion reaction layer 25 is less than 50 nm, the adhesion reaction layer 25 is so thin that the adhesive strength is insufficient. On the other hand, if the average thickness Tn exceeds 1,000 nm, the cross-linking density of the adhesion reaction layer 25 decreases to result in reduction of adhesive strength. It is therefore preferable that the average thickness Tn of the adhesion reaction layer 25 is 100 nm or more, and is 500 nm or less.

As well known, the "fractal dimension" is an index for showing a complexity of a shape, a degree of irregularity of a surface, and the like. The larger the fractal dimension value, the more complex the irregularity is. In the present embodiment, the fractal dimension of the interface S of the adhesion reaction layer 25 is set to 1.001 or more, thereby increasing the degree of irregularity of the interface S to render it complicated and increasing the surface area thereof. It is thereby possible to enhance the bonding force between the adhesion reaction layer 25 and the rubber 12. If the fractal dimension is less than 1.001, the bonding force between the adhesion reaction layer 25 and the rubber 12 after the wet heat deterioration is decreased. However, if the degree of irregularity becomes large to such an extent that the fractal dimension exceeds 1.300, the bonding force between the adhesion reaction layer 25 and the rubber 12 after the wet heat deterioration decreases. Therefore, it is preferable that the lower limit of the fractal dimension is at least 1.050, especially at least 1.100, and the upper limit of the fractal dimension is at most 1.250.

Further, as well known, the "fractal dimension" can be obtained, for example, by a box counting method. Specifically, for example, a TEM photograph (transmission electron microscopic photograph) of an adhesion reaction layer is subjected to image processing to extract a curved line along its interface. The fractal dimension of the extracted curved line is then obtained by the box counting method. In this box counting method, the curved line is divided into small square regions (boxes) each having one side with a length of "r", and while the length "r" is changed, the number of small regions (boxes) each including a segment of the target curved line is counted. The counted number of small regions (boxes) is plotted as ordinate and the length of "r" at the time of counting is plotted as abscissa on a logarithmic graph, and the fractal dimension is obtained from the inclination of the graph. The average thickness Tn of the adhesion reaction layer 25 can also be obtained from the above-mentioned curved line along the interface shape.

The fractal dimension of the interface S of the adhesion reaction layer 25 and the average thickness Tn of the adhesion reaction layer 25 can be adjusted by selecting the conditions of the current density and the diffusion temperature in electroplating for the copper plating and the zinc plating, and also by selecting the current density condition in plating of the third component.

Preferable conditions on the fractal dimension of the interface S of the adhesion reaction layer 25 and the average thickness Tn of the adhesion reaction layer 25 are as mentioned below, namely (A) to set the current density of electroplating within a specific range higher than a conventional one, in formation of the primary plated layers 20 (20A, 20B, 20C); and (B) to set the temperature (diffusion temperature) in thermal diffusion treatment within a specific range lower than a conventional one;

whereby the adhesion reaction layer 25 as defined above can be obtained. Specifically, it is preferable that the current density in electroplating for the copper plated layer 20A is raised to the range of 15 to 25 A/dm$^2$, the current density in electroplating for the zinc plated layer 20B is raised to the range of 40 to 60 A/dm$^2$, and the thermal diffusion is performed at a low diffusion temperature within the range of 500 to 550° C. It should be noted that in a conventional brass plating of wires, the current density for the copper plated layer is set to about 10 A/dm$^2$, the current density for the zinc plated layer is set to about 20 A/dm$^2$, and the diffusion temperature is set to a range of 560 to 600° C. Further, in the case of conducting electroplating for the third metal plated layer 20C, it is preferable to raise the current density to the range of 30 to 40 A/dm$^2$.

Further, as shown in FIG. 3(C), in the case of forming a zinc alloy plated layer 20D, i.e., zinc/nickel alloy plated layer or zinc/cobalt alloy plated layer in place of the zinc plated layer 20B, the current density in electroplating for the zinc alloy plated layer 20D is set to the range of 40 to 60 A/dm$^2$, as in the case of the zinc plated layer 20B.

As stated above, the brass plated layer 16E may be a ternary alloy plating containing nickel or cobalt. However, in the case of adding nickel as a third metal, if the amount of nickel added is less than 1.0 part by weight based on 100 parts by weight of the plating, the plated layer 16E is easy to change to a fragile grain structure after wet heat deterioration and tends to cause peeling from this changed portion. On the other hand, if the amount of nickel added exceeds 10.0 parts by weight, the thickness T of the adhesion reaction layer 25 becomes thin to decrease the adhesive strength, and also the plated layer 16E becomes hard to deteriorate the wire drawing processability. Hence, the amount of nickel added is preferably within the range of 1.0 to 10.0 parts by weight.

Further, in the case of adding cobalt as a third metal, if the amount of cobalt added is less than 0.1 part by weight based on 100 parts by weight of the plating, the plated layer 16 is easy to change to a fragile grain structure after wet heat deterioration and tends to cause peeling from this changed portion. On the other hand, if the amount of cobalt added exceeds 5.0 parts by weight, the thickness T of the adhesion reaction layer 25 becomes thin to decrease the adhesive strength, and also the plated layer 16E becomes hard to deteriorate the wire drawing processability. Hence, the amount of cobalt added is preferably within the range of 0.1 to 5.0 parts by weight.

In the present example has been illustrated a case where the rubber-cord complex 9 is applied to a ply for tire reinforcement, particularly a belt ply. However, the rubber-cord complex 9 can also be applied to other plies for tire reinforcement, such as a carcass ply and a bead reinforcing ply. Further, the metal cord 10 may be used as a bead wire for forming a bead core 5. In such a case, the metal cord 10 is made of a single plated wire 17, and it is considered that the pneumatic tire 1 itself constitutes the rubber-cord complex 9. In addition to those described above, the rubber-cord complex 9 is also applicable to a variety of rubber products such as a hose and a industrial belt. Further, as the material for the metal element wire 15 can be used, besides steel mentioned above, a variety of metal materials which are capable of forming the brass plated layer 16, such as aluminum, copper and titanium, and with the use of any of the metal materials, it is possible to effectively exert the above-mentioned action and effect.

A particularly preferable embodiment of the present invention has been described above in detail, but the present invention is not limited to the embodiment shown in the drawings and various changes and modifications can be made in practicing the invention.

EXAMPLES (1) A brass plated layer was formed on the surface of a steel wire having a diameter of 1.7 mm. The plated wire was then subjected to wire drawing treatment to give a drawn plated wire having a diameter of 0.27 mm.

The brass plating was carried out by any of the following methods.

(A) A copper plated layer and a zinc plated layer were successively formed and then subjected to a thermal diffusion treatment to form a binary alloy brass plated layer. This method is referred to as a method A.

(B) A copper plated layer, a zinc plated layer and a third metal plated layer were successively formed and then subjected to a thermal diffusion treatment to form a ternary alloy plated layer. This method is referred to as a method B.

(C) A copper plated layer and a zinc alloy (zinc/nickel alloy or zinc/cobalt alloy) plated layer were successively formed and then subjected to a thermal diffusion treatment to form a ternary alloy plated layer. This method is referred to as a method C.

Both sides of an array of metal cords each of which is formed by twisting the drawn plated wires and has a 1×3 structure, were sandwiched between unvulcanized rubber sheets having the composition shown in Table 1, and then heated in a press-contacted state (165° C., 18 minutes) for vulcanization to give a sample of a cord ply. Each of the samples obtained in such a manner was then subjected to a peeling test, and the initial adhesive property and the wet heat adhesive property of the metal cords were compared.

The wet heat adhesive property was measured by allowing the above-mentioned sample to stand in an oven at a temperature of 80° C. and a relative humidity of 95% for 20 days and then subjecting the sample in a wet heat deterioration state to a peeling test. The initial adhesive property was measured by allowing the sample after the vulcanization to natural cooling at ordinary temperature and humidity [20° C., 50% (relative humidity)] and then subjecting it to a peeling test. The peeling test was conducted by peeling the sample from its one end along the rubber/metal cord interface at a speed of 50 mm/min., and the state of the metal cord surface at the interface was evaluated according to the following criteria.
5: The surface is fully covered with the rubber, and the plated layer surface of the steel cord is invisible.
4: The plated layer is visible at 3 to 6 places on the peeled surface.
3: The plated layer is visible at 11 to 16 places on the peeled surface.
2: The plated layer is visible at 21 or more places on the peeled surface, but not less than 60% of the whole plated layer surface is covered with the rubber.
1: The total area of the plated layer surface covered with the rubber is not less than 10% and less then 30%.

In Table 2, the evaluation is performed with scores in steps of 0.5, where a surface state out of the integer score range applies such evaluation.

(2) A pneumatic tire (size: 195/65R15) using the above-mentioned steel cord as a belt cord was produced according to the following specification, and the high-speed durability of the tire was tested.
(Belt Layer)
  The number of plies: 2 plies
  Cord angle: (+20°, −20°)
  The number of cords: 40 cords/5 cm
(Carcass)
  Cord: 1,670 dtex/2 (polyester)
  The number of plies: 1 ply
  Cord angle: (90°)
  The number of cords: 50 cords/5 cm
<High-Speed Durability Test>
Under conditions of an internal pressure of 280 kPa and a load of 492 kgf, a drum driving test apparatus was started at a speed of 170 km/h, and the speed was increased in stages by 10 km/h every 10 minutes. A distance driven until destruction of the tire was measured and shown as an index relative to the result of Comparative Example 1 taken as 100. The larger the value, the better the high-speed durability is.

TABLE 2

|  | Example 1 | Example 2 | Example 3 | Example 4 | Example 5 | Example 6 | Example 7 | Example 8 |
|---|---|---|---|---|---|---|---|---|
| Plating method | A | A | B | B | B | B | B | B |
| Cu (parts by weight) | 63.2 | 65.7 | 66.4 | 67.1 | 68.2 | 65.1 | 68.2 | 69.1 |
| Zn (parts by weight) | 36.8 | 34.3 | 33.1 | 30.8 | 27.0 | 33.8 | 27.2 | 21.7 |
| Ni (parts by weight) | 0 | 0 | 0 | 0 | 0 | 1.1 | 4.6 | 9.2 |
| Co (parts by weight) | 0 | 0 | 0.5 | 2.1 | 4.8 | 0 | 0 | 0 |
| Fractal dimension of adhesion reaction layer surface |  |  |  |  |  |  |  |  |
| Initial | 1.067 | 1.093 | 1.104 | 1.084 | 1.187 | 1.083 | 1.173 | 1.063 |
| After wet heat deterioration | 1.053 | 1.024 | 1.042 | 1.021 | 1.103 | 1.036 | 1.098 | 1.024 |
| Average thickness of adhesion reaction layer |  |  |  |  |  |  |  |  |
| Initial <nm> | 75 | 63 | 68 | 61 | 51 | 63 | 59 | 51 |
| After wet heat deterioration <nm> | 690 | 820 | 680 | 510 | 350 | 480 | 210 | 116 |
| Peeling resistance (adhesive property) |  |  |  |  |  |  |  |  |
| Initial | 5.0 | 5.0 | 5.0 | 4.0 | 4.0 | 5.0 | 4.0 | 4.0 |
| After wet heat deterioration | 2.0 | 1.5 | 1.5 | 2.0 | 2.5 | 1.5 | 2.0 | 2.5 |
| High speed durability of tire | 109 | — | — | — | 112 | — | 108 | — |

|  | Com. Ex. 1 | Com. Ex. 2 | Com. Ex. 3 | Com. Ex. 4 | Example 9 | Example 10 | Com. Ex. 5 |
|---|---|---|---|---|---|---|---|
| Plating method | A | A | B | B | C | C | C |
| Cu (parts by weight) | 63.3 | 62.9 | 65.1 | 62.9 | 69.0 | 67.9 | 68.5 |
| Zn (parts by weight) | 36.7 | 37.1 | 29.0 | 25.3 | 30.5 | 28.2 | 30.2 |
| Ni (parts by weight) | 0 | 0 | 0 | 11.8 | 0 | 0 | 0 |
| Co (parts by weight) | 0 | 0 | 5.9 | 0 | 0.5 | 3.9 | 0.3 |
| Fractal dimension of adhesion reaction layer surface |  |  |  |  |  |  |  |
| Initial | 0.987 | 0.998 | 0.983 | 1.031 | 1.126 | 1.177 | 0.980 |
| After wet heat deterioration | 0.991 | 1.312 | 0.987 | 1.355 | 1.114 | 1.143 | 0.982 |
| Average thickness of adhesion reaction layer |  |  |  |  |  |  |  |
| Initial <nm> | 68 | 53 | 37 | 23 | 47 | 40 | 46 |
| After wet heat deterioration <nm> | 1130 | 820 | 46 | 45 | 320 | 265 | 1150 |

TABLE 2-continued

| Peeling resistance (adhesive property) | | | | | | | |
|---|---|---|---|---|---|---|---|
| Initial | 4.0 | 4.0 | 2.0 | 1.5 | 4.0 | 4.0 | 3.0 |
| After wet heat deterioration | 0.5 | 1.0 | 0.5 | 1.0 | 2.5 | 3.0 | 0.5 |
| High speed durability of tire | 100 | — | 87 | — | 111 | 115 | 90 |

As shown in the table, it can be confirmed from the peeling test that the metal cords of the examples according to the present invention are excellent in adhesive property after wet heat deterioration to the rubber. Further, it can also be confirmed from the high-speed durability test that reduction in adhesive property due to heat can be suppressed to thereby allow improvement in high-speed durability of tires.

What is claimed is:

1. A method of producing a rubber-cord complex obtained by vulcanizing a rubber to adhere it to a metal cord comprising at least one drawn plated wire having a brass plated layer, wherein the rubber-cord complex has an adhesion reaction layer formed by a cross-linking reaction of sulfur in the rubber and copper in the brass plated layer, between the rubber and the brass plated layer, and in a wet heat deterioration state after being held in an atmosphere having a temperature of 80° C. and a relative humidity of 95% for 20 days, said rubber-cord complex has the average thickness of the adhesion reaction layer being from 50 to 1,000 nm, and the interface between the adhesion reaction layer and the rubber having a fractal dimension of 1.001 to 1.300, said method comprising:

a plating step for forming a brass plated layer containing copper, zinc, and cobalt on the surface of a metal wire, said plating step comprising:

forming a copper plated layer on the surface of a metal element wire by an electroplating treatment in a copper plating bath, wherein a current density of said electroplating treatment for the copper plated layer is 15 to 25 A/dm$^2$, forming a plated layer of an alloy of zinc and cobalt on said copper plated layer by an electroplating treatment in an alloy bath containing zinc and cobalt, wherein a current density of said electroplating treatment for the plated layer of the alloy of zinc and cobalt is 40 to 60 A/dm$^2$, and forming the brass plated layer by thermal diffusion of the copper plated layer and the plated layer of the alloy of zinc and cobalt, wherein the thermal diffusion is conducted by a low temperature diffusion at a temperature of 500 to 550° C.;

a drawing step for drawing the plated wire provided with the brass plated layer by said plating step so as to obtain said drawn plated wire; and a vulcanizing step for vulcanizing the rubber to adhere it to the metal cord comprising said drawn plate wire.

2. A method of producing a rubber-cord complex obtained by vulcanizing a rubber to adhere it to a metal cord comprising at least one drawn plated wire having a brass plated layer, wherein the rubber-cord complex has an adhesion reaction layer formed by a cross-linking reaction of sulfur in the rubber and copper in the brass plated layer, between the rubber and the brass plated layer, and in a wet heat deterioration state after being held in an atmosphere having a temperature of 80° C. and a relative humidity of 95% for 20 days, said rubber-cord complex has the average thickness of the adhesion reaction layer being from 50 to 1,000 nm, and the interface between the adhesion reaction layer and the rubber having a fractal dimension of 1.001 to 1.300, said method comprising:

a plating step for forming a brass plated layer containing copper, zinc, and cobalt on the surface of a metal wire, said plating step comprising:

forming a copper plated layer on the surface of a metal element wire by an electroplating treatment in a copper plating bath, wherein a current density of said electroplating treatment for the copper plated layer is 15 to 25 A/dm$^2$, forming a zinc plated layer on said copper plated layer by an electroplating treatment in a zinc plating bath, wherein a current density of said electroplating treatment for the zinc plated layer is 40 to 60 A/dm$^2$, forming a cobalt plated layer on said zinc plated layer by an electroplating treatment in a cobalt bath, wherein a current density of said electroplating treatment for the cobalt plated layer is 30 to 40 A/dm$^2$, and forming the brass plated layer by thermal diffusion of the copper plated layer, the zinc plated layer, and the cobalt plated layer, wherein the thermal diffusion is conducted by a low temperature diffusion at a temperature of 500 to 550° C.;

a drawing step for drawing the plated wire provided with the brass plated layer by said plating step so as to obtain said drawn plated wire; and a vulcanizing step for vulcanizing the rubber to adhere it to the metal cord comprising said drawn plate wire.

* * * * *